May 20, 1947.  R. MAILLET  2,420,672
GEOPHYSICAL PROSPECTING
Filed Feb. 4, 1939  3 Sheets-Sheet 1

Inventor:
Raymond Maillet
By Louise O'Neil
Attorney

May 20, 1947. R. MAILLET 2,420,672
GEOPHYSICAL PROSPECTING
Filed Feb. 4, 1939 3 Sheets-Sheet 2
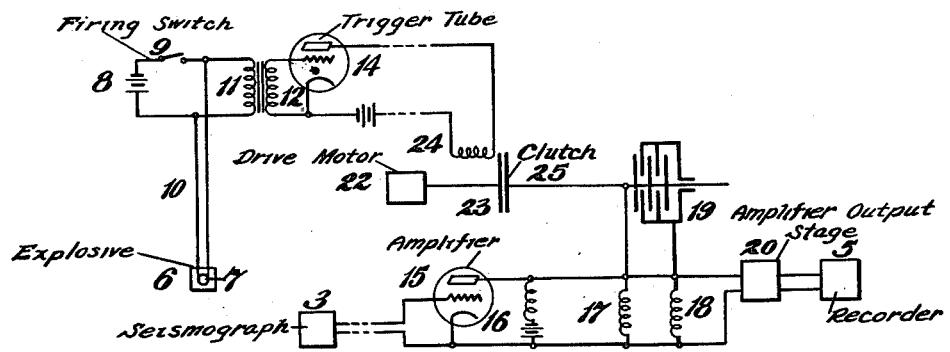
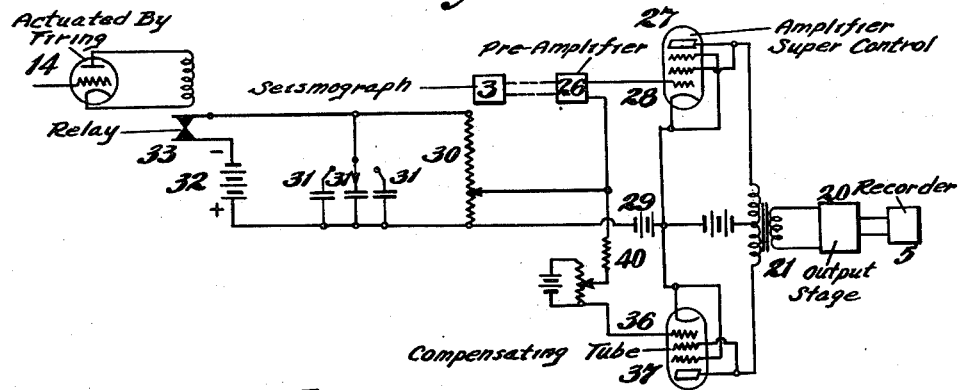
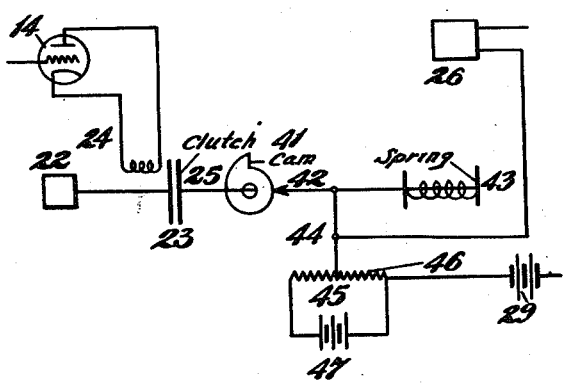
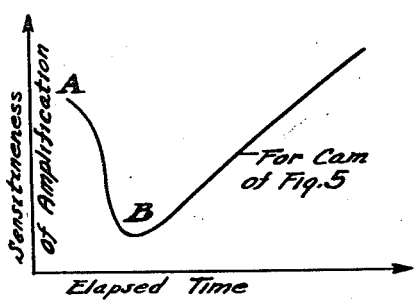
Inventor:
Raymond Maillet,
By Louise O'Neil
Attorney May 20, 1947.  R. MAILLET  2,420,672
GEOPHYSICAL PROSPECTING
Filed Feb. 4, 1939  3 Sheets-Sheet 3

Inventor:
Raymond Maillet
By Louis O'Neil
Attorney

Patented May 20, 1947

2,420,672

UNITED STATES PATENT OFFICE 2,420,672

GEOPHYSICAL PROSPECTING

Raymond Maillet, Paris 16E, France; vested in the Attorney General of the United States Application February 4, 1939, Serial No. 254,743
In France January 5, 1939

9 Claims. (Cl. 177—352)

My invention relates to geophysical prospecting, and in particular to the automatic control of the sensitiveness and the frequency selectivity of the amplification of seismic waves as a function of the time elapsed following the detonation of explosive.

It is known that in seismic underground prospecting methods, the time intervals elapsing between the emission of elastic waves from a given point and the return to the ground surface of said waves after reflection on the geological discontinuity surfaces of the underground may be measured and observed by means of a plurality of seismographs suitably distributed over the surface of the ground or near said surface. From the various time intervals corresponding to the respective seismographs, it is possible to deduce the speeds of propagation, if the latter have not been determined in advance by direct measurements made in big bore-holes, and the depths of the various reflecting horizons, as well as their dips, in magnitude and azimuth. It is thus possible to obtain very accurate and very complete information concerning the tectonic structure of the underground.

Thus, seismic underground prospecting is very similar to echo methods as used in hydrography. As a matter of fact, this remark was made by Harvey C. Hayes, in a paper read on March 21, 1923, and published in the Journal of Franklin Institute (March 1924, pages 323 to 354). In particular, he made the following statement at pages 353-354:

"The echo method of determining depths is not confined to determining submarine depths. It should serve equally well for determining the depths below the earth's surface of abrupt changes or discontinuities in the earth's crust such as are offered by coal and oil deposits or subterranean caverns. These surfaces of discontinuity will reflect to the surface a part of any sound disturbance that may be transmitted to them."

The train of sound or elastic waves is produced in any suitable manner, but most often by detonation of a charge of explosives, with sufficient stemming, placed for instance at the bottom of a small bore hole of a depth of some yards or some tenths of yards and filled with water. Or again this charge is placed on the bottom of a river, a lake, or the sea, or is buried in a furrow made in the ground with a linear density of charging sufficiently low to produce a camouflet effect. The seismographs, suitably distributed on the ground surface, but most generally buried at a small depth so as to protect them against the action of wind and, as far as possible, aerial sounds, collect the elastic energy delivered by the various waves thus emitted, and transform it into electrical energy. The electromotive force supplied by each seismograph depends upon the displacement, or the speed, or again the acceleration, of the ground, or upon one or several derivatives of this acceleration, at the point where the seismograph is located, or upon a combination of these factors. After having been suitably amplified and filtered, the voltage waves supplied by the respective seismographs are transmitted to a multiple oscillograph which records them on a band of paper, or a photographic film, or otherwise, together with a signal indicating the time at which the waves were emitted, and the marks of an accurate time counter, for instance an electrically operated tuning fork. The oscillograms obtained are studied with a view to determining, among all the information supplied by the seismographs, that which corresponds to waves returned from the subterranean space after reflection on a geological contact, and to determining their time of propagation.

Theory and experience have taught that the propagation of the waves from the point of explosion is a highly complex phenomenon. On the one hand there are condensation waves, on the other hand distortion waves, both of these kinds propagating in all directions, and finally, close to the surface, bi-dimensional waves, especially the so-called Rayleigh and Love waves. These surface waves are the slowest; they have a considerable amplitude and this amplitude decreases rather slowly according to the distance of propagation, due to the fact that these waves are propagated only in two directions. They have a rather clear pseudo-periodic character and their frequency spectrum is essentially constituted of very low frequencies, say from 5 to 15 Hertz, by way of indication.

On the oscillographic records, it is of interest to eliminate the movements of the ground that are due to the waves of all kinds which have travelled close to the ground or at a relatively low depth, and more especially the waves of the third kind, because these particular waves cannot give any interesting information concerning the geological and tectonic structure of the deep strata, but, on the contrary, risk over-loading the receiving apparatus, and anyway complicating the curves that are obtained, so that the identification of the reflected waves is made more difficult or even impossible.

These last mentioned reflected waves, and especially the longitudinal reflected waves, have a highly complicated frequency spectrum, but the components that predominate therein are not of such low frequency as those of the surface waves. By way of indication, the frequencies that predominate in reflected waves generally correspond to a range from 25 to 100 Hertz.

On the other hand, experience has taught that the discontinuity surfaces called "mirrors" give reflected waves such that, on the one hand the amplitude is lower, other things being equal, and, on the other hand, the frequency spectrum is poorer in high-frequency components, and therefore relatively rich in low-frequency components, the lower the depth of these mirrors. The loss of amplitude is explained, at least partly, by the normal decreasing of this amplitude as a function of distance over which the wave has travelled and also by the energy losses due to the waves reflected by the successive geological contacts. The relative absorption of the high-frequency components in comparison with the low-frequency components can reasonably be attributed to absorption and diffraction phenomena. For instance, some slightly coherent formations, such as sand, may be but imperfectly transparent. This phenomenon would be analogous to the gradual reddening of white light by fog.

Whatever be the causes, the first of the two above mentioned phenomena relating to small amplitude for deep reflecting surfaces, imposes the following conditions:

For given positions of the point from which the waves are emitted and of the seismographs, several successive experiments are necessary, with more and more intense emissions, that its to say, as a rule with greater and greater charges of explosive. Low intensity emissions will permit of correctly recording the waves reflected from the shallowest mirrors. With the high intensity emissions, the over-loading of the apparatus and the distortion it produces, the intricate superposition of the various oscillographic tracings or the fact that they frequently go out beyond the field if the recording is effected by deviation, the reduction of the sensitized emulsion over its whole thickness if the recording is made with the variable density method, will not permit of observing the shallowest mirrors but, on the contrary, the deepest mirrors will supply reflected waves sufficiently intense to be easy to discern on the oscillograms and to mark with accuracy.

But the fact of thus making several successive experiments at a given station involves a loss of time and money which should be avoided. It is possible to make a single experiment, with a sufficiently intense emission of elastic waves for ensuring a suitable recording of deep reflections, provided that the sensitiveness of the receiving apparatus varies, according to a given law, as a function of the time having elapsed from the emission, and in such manner that the apparatus is never overloaded but that the gradual increase of sensitiveness as a function of time compensates the gradual decrease of amplitude of the successive reflected waves, in order to maintain a good readability as the recording takes place.

As a matter of fact, it is still necessary, as a rule, to effect, in addition to the chief experiment above described, a recording with uniform and maximum sensitiveness corresponding to a low intensity emission, in order to determine, for each of the siesmographs, the time at which the front of the fastest superficial wave reaches it. This time occurs in the calculation of the corrections to be applied for taking into account the presence under the ground surface of strata more or less decomposed by atmospheric and biologic influences and in which the conditions of propagation are abnormal.

The problem of automatically controlling the sensitiveness is similar to those existing in audible or supersonic sounding for the determination of submarine depths.

In this field of application, this problem has been solved by automatically varying, as a function of time, the sensitiveness of the thermionic tube amplifiers interposed between the wave receiver (microphone) and the recorder. This automatic variation of sensitiveness is for instance obtained by varying, as a function of time and for one or several of the tubes of the amplifier, the bias of their control grids.

On the other hand, the fact that, in the frequency spectrum of the reflected waves, the predominating components are not of as low frequency as is the frequency spectrum of the superficial waves, has been used for a long time for eliminating or reducing the disturbing action of these superficial waves. The amplifiers have been rendered selective, and even have been combined with complete filters, the cut-off frequency being chosen low enough for allowing the lowest frequency reflected waves to pass without too great an alteration, and high enough for intercepting the superficial waves as far as possible.

The object of the present invention is to take advantage of the property of the reflected waves of being relatively the richer in low frequencies as they come from the deepest mirrors.

This result is obtained, according to the present invention, by varying the frequency curve of the amplifiers as a function of the time having elapsed since the time of emission, in such manner as to permit the passage of components which are the lower the greater the time thus elapsed.

With this system, at the beginning of the observation, the cut-off frequency or limit of the passing band can be chosen relatively high for ensuring a good elimination of the superficial waves. This cut-off frequency or this passing band is then automatically varied and generally lowered gradually along the frequency scale, so as to permit a good recording of the waves which have been reflected from the deep mirrors, the superficial waves having then disappeared or, at least, having but reduced amplitudes which permit this lowering.

According to another feature of the present invention I combine this characteristic with the automatic variation of sensitiveness as a function of time.

Another object of the present invention is to provide a device for obtaining these results.

Other features of the present invention will result from the following detailed description of some specific embodiments thereof.

Preferred embodiments of the present invention will be hereinafter described, with reference to the accompanying drawings, given merely by way of example, and in which:

Fig. 3 is a general view of a system according to my invention, including one of the seismographs, its amplifier, and a recording element, with means for automatically varying selectivity;

Fig. 4 shows another embodiment of the amplifier, ensuring automatic variation, as a function of time, both of selectivity and sensitiveness;

Fig. 5 is a partial view showing another embodiment of the invention;

Fig. 6 is a diagram showing, by way of example, a sensitiveness curve corresponding to the arrangement of Fig. 5;

On all the figures, the same reference characters designate the same parts.

Fig. 1 shows a diagrammatic section of the ground. The waves are emitted from center 1, the initial shock being generally produced by a charge of dynamite the magnitude of which depends upon the dimensions of the field which is to be studied, the charge being more considerable the deeper the mirrors to be detected.

I have shown the path of travel of the superficial rays, as well as that of the rays reflected from a deep mirror 2. These waves are received at suitably chosen points by means of suitable seismographs 3, connected through electric circuits with a recording center provided with amplifiers 4 and a multiple recorder 5.

Figure 2:
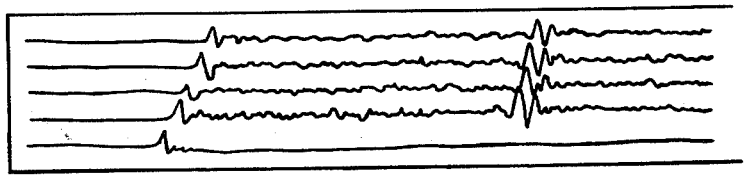
Fig. 2 is a diagram showing, by way of example, a recorded curve system.

The recording of the various curves is generally effected on the same tape in such manner as to obtain, for instance, the curves shown by Fig. 2.

In order to obtain automatic variation of selectivity as a function of time, a method consists in disposing, at the input end of amplifiers 4, or between two stages of said amplifiers, a frequency filter of the high-pass kind, that is to say a filter which permits the passage of frequencies higher than a predetermined value and constituted, for instance, by a filter unit including two reactance coils in shunt with the line and a condenser in series therewith.

It is known that the cut-off frequency of a filter of this kind depends upon the value of the capacity of this condenser.

By varying this capacity, I obtain therefore the desired variation of the selectivity.

Fig. 3 diagrammatically shows a device for obtaining the automatic variation of the selectivity.

Figure 1:
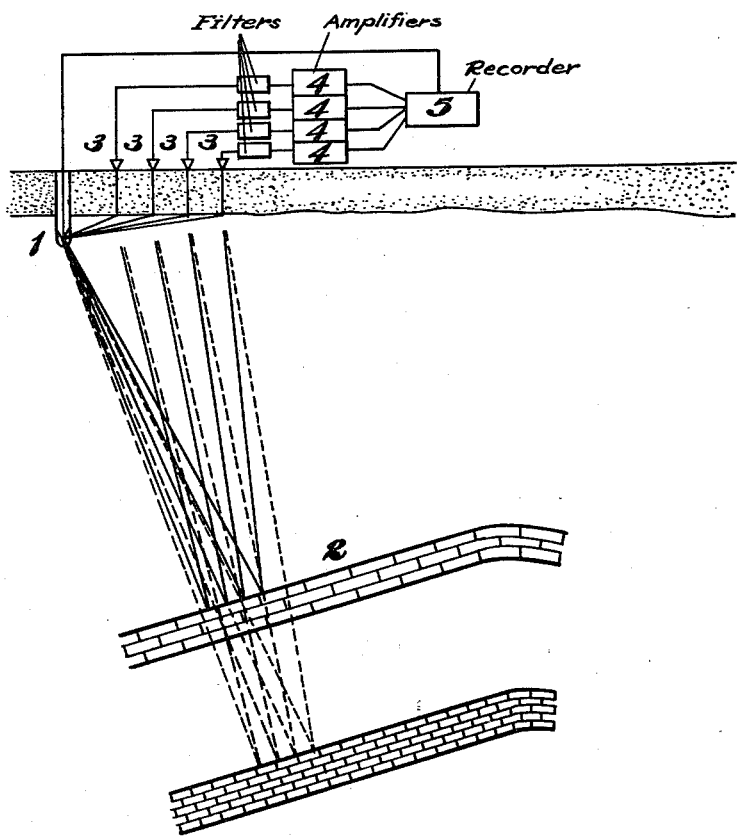
Fig. 1 is a diagrammatic explanatory representation illustrating the arrangement of the apparatus and the travel of the waves in the ground.

In this system, 6 is the charge of explosive located at the point of emission 1 of Fig. 1, and the ignition of which is produced by an electric detonator 7 operated by battery 8 through switch 9 and wires 10.

Battery 8 feeds in parallel with detonator 7 the primary 11 of a transformer the secondary 12 of which is connected to the grid 13 of a gas-filled tube 14 or "Thyratron."

The plate circuit of this tube 14 is connected to the winding 24 of an electro-magnetic clutch located at the recording station and which is hereinafter described.

Reference numeral 3 diagrammatically shows a seismograph acting through a suitable line on the grid 15 of a vacuum tube 16 used as an amplifier also located at the recording station.

In the plate circuit of this tube is inserted the filter above mentioned, this filter consisting of two reactance coils 17—18 (generally with iron cores) mounted in shunt with respect to the line and the ends of which, opposite their common point, are connected respectively to the two rotors of a variable condenser 19. The output of this filter feeds current to the other stages, diagrammatically shown at 20, of the amplifier, which controls one of the oscillographs of recorder 5.

Reference numeral 22 designates an electric motor which is started a short time before the charge of explosive is ignited. This motor drives, by means of an electro-magnetic clutch diagrammatically shown by the two plates 23, the rotor keyed on the spindle 25 of the variable condenser 19. This electromagnetic clutch is itself actuated by winding 24 which is inserted in the plate circuit of tube 14.

This apparatus works in the following manner:

Electric motor 22 turning at its normal speed, switch 9 is operated. During the short period of time (some thousandths of a second) necessary for bringing the filament of detonator 7 to incandescence, the source of current 8 is practically short-circuited and, consequently, the intensity of the current in the primary 11 of the transformer is negligible.

The short-circuit so produced in the detonator is eliminated at the time of the explosion. This produces a substantial output or flow of current through primary 11, and therefore an induced electro-motive force at the terminals of secondary 12. The connections of the transformer are designed in such manner that this electro-motive force increases the potential of grid 13, whereby the plate current of tube 14 increases substantially at the time of the explosion, and the tube 14 remains conductive until its plate circuit is opened after the observations are completed. As a consequence, clutch 23 is thrown in and the rotor of condenser 19 is started rotating.

The outline of the plates of this condenser is chosen in such manner as to obtain the desired law of variation.

The impulse received by seismograph 3 are amplified by tube 16, and only the frequencies higher than the cut-off frequency are transmitted to the next stages 20 of the amplifier and to recorder 5.

This arrangement permits of obtaining the desired result, to wit an automatic variation of the cut-off frequency as a function of time, and hence an automatic variation of selectivity.

Figure 9:
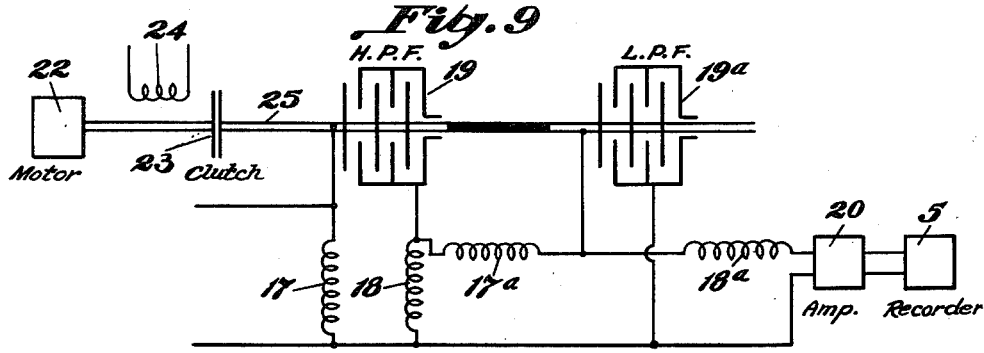
Fig. 9 shows the automatic selectivity varying system of Fig. 3, with the addition of a low pass filter.

It is clear, that the high-pass filter 17—18—19 may be supplemented by a low-pass filter including variable condensers also keyed on spindle 25 which is driven through clutch 23. In this way, the last stages 20 of the amplifier would receive only frequencies ranging within two given limits variable as a function of time. Such an arrangement is shown in Fig. 9, the low pass filter being constituted of inductors 17a, 18a, and variable condenser 19a insulatedly driven by spindle 25. The ensemble of the two filters (the high-pass filter and the low-pass filter) provides a band pass filter. On the other hand, it is clear that filter 17—18—19 might be constituted in any other way, the same as the control of clutch 23 might be made differently.

Fig. 4 shows another embodiment of the amplifier in which I obtain both automatic variation of selectivity and that of sensitiveness.

Automatic variation of sensitiveness is obtained in this case by varying the bias of the grids of one of the stages of the amplifier.

This stage is constituted by a tube 27, itself fed with current through a pre-amplifier 26, controlled by seismograph 3.

The bias voltage applied to the control grid 28 of tube 27 includes a constant component supplied by battery 29 and a variable component which is given by the voltage drop across resistance 30.

This resistance 30 receives the discharge current of a condenser 31 which is charged by battery 32 across the contacts 33 of a relay, normally closed, the winding 34 of which receives the plate current of a trigger tube 14, mounted exactly in the same manner as in the example shown by Fig. 3. Therefore, this winding 34 replaces the winding 24 of Fig. 3.

It will be readily understood that, at the time of the explosion, winding 34 attracts its armature which opens contacts 33. Therefore, condenser 31 is gradually discharged through resistance 30. It follows that the negative grid bias voltage is maximum at the time of the explosion and decreases in a continuous manner as a function of time. The constants of the law according to which it decreases are adjustable as determined by the choice of condensers 31, through switch 35 and of the adjustable point of contact on resistance 30. Therefore, in this way, I fix on the one hand the time of reduction of the variable component of grid bias voltage and, on the other hand, the initial value thereof. It goes without saying that these two adjustments might be obtained otherwise.

The plate current of amplifier tube 27 is in turn transmitted, through a transformer 21, to the other stages 20 of the amplifier which feed current to recorder 5.

It will be readily understood that, as a consequence of the variation of the bias, the plate current of amplifier tube 27 increases in a continuous manner as a function of time. It therefore follows that a parasitic signal is produced which would be transmitted to the next stages of the amplifier. In order to eliminate it, I mount in opposition to tube 27, according to a well known arrangement for compensation, an identical tube 37 the control grid of which, 36, receives the variable bias from resistance 30, but of course does not receive the seismograph signal from pre-amplifier 26. Therefore, transformer 21 is of the push-pull type as shown by the drawing.

Furthermore, connected to the control grid 36 there is mounted a potentiometer 39, which permits of adjusting the bias of grid 36, in such manner as exactly to balance the increases of the anode currents of tubes 27 and 37, when there are variations of bias voltage at the terminals of resistance 30. Furthermore, I insert, if need be, a resistance 40 in the grid circuit 36 to balance the impedance introduced in the circuit of grid 28 of tube 27 through the pre-amplifier 26.

It will be noted that amplifier tube 27 is constituted by a pentode, the suppressor (the grid closer to the anode) of which is connected to the cathode, the screen grid being directly connected to the plate.

Figure 7:
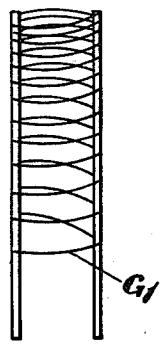
Fig. 7 shows in elevation a grid having spirals whose spacing increases from one end to the other end of the grid.
Figure 8:
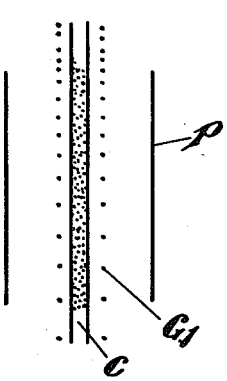
Fig. 8 shows diagrammatically in cross section the grid spirals of the tube whose grid is shown in Fig. 7.

On the other hand, in this tube 27 it is very advantageous to arrange this control grid in such manner that the spirals or convolutions thereof are at intervals which increase gradually from one end of this electrode to the other end thereof. In other words, it is advantageous to employ, as tubes 27 and 37, so-called "selectode," "super-control" or multigrid variable mu tubes. The grid structure of such tubes is shown in Figs. 7 and 8, wherein $G_1$ represents the grid, P the plate and C the cathode.

This arrangement permits of obtaining the automatic variation of selectivity as a function of time. It is known that the variation of the plate current of a thermionic tube as a function of the frequency is the greater (for a predetermined variation of the control grid tension) the lower the internal resistance of the tube, the influence upon the plate current of the load impedance (constituted in this case by transformer 21) being the more considerable as the internal resistance is lower.

In order fully to explain this point, it should be remembered that, below the secondary resonance and dispersion frequencies, a transformer coupling (such as that obtained with 21), produces, in point of fact, the same effects, to within a constant factor (equal to the transformation ratio $a$), as a coupling obtained through a reactance coil $L_1$ constituted by the primary of this transformer. If $R_1$ designates the total resistance of the primary circuit, essentially constituted, in this case, by the internal resistance of tube 27, the gain is given by the following formula:

$$\frac{Ka}{\sqrt{1+\left(\frac{R_1}{L_1\omega}\right)^2}}$$

in which K designates the factor of amplification of tube 27 and $\omega$ the angular frequency of the signal.

For a given value of said frequency, the gain increases, other things being equal, when resistance $R_1$ decreases. Therefore the range of the frequencies that are transmitted will gradually extend toward lower and lower frequencies, as the time elapses from the explosion, if the internal resistance of the tube gradually decreases. Now, the gradual disappearance of the grid bias voltage available at the terminals of resistance 30 will gradually open a passage for the electrons through the zones of tube 27 where the pitch of the control grid 28 becomes smaller and smaller and thus gradually lower the internal resistance of tube 27.

It should be noted that the problem in this case is exactly the inverse of the conditions existing in radio-telephony for the amplification of high and mean frequencies with an automatic control of the gain. In this case, it is endeavored to make tubes, the internal resistance of which is, under all circumstances, very high as compared with the load impedance. This is the reason why super-control tubes or selectodes are, in general, tubes having a screen grid (tetrodes, pentodes, etc.) and why it is difficult to find, on the market, selectode triodes, that is to say tubes of this kind having a grid pitch variable along said electrode. But it is clear that the present invention might be carried out by employing, as tubes 27 and 37, such selectode triodes, if they were on the market. As a matter of fact this is not necessary because I have found by experience that, by taking pentode tubes of the E. F. 5 type or the 956 pentode, and by connecting, in these tubes, the screen grid to the plate, I obtained the equivalent of a low internal resistance triode. Furthermore, the value of this internal resistance varies gradually and within wide limits in accordance with the negative bias voltage of the control grid. Therefore, tube 27 (and also, of course, tube 37) can be merely constituted by 956 type, or E. F. 5 type tubes, or the like, in which the screen grid is directly connected to the plate.

It will be noted that, in the arrangement illustrated by Fig. 4, the law of variation of the bias voltage as a function of time is necessarily an exponential law (discharge of a condenser across a resistance). If it is desired to obtain another given law, the bias voltage variation is controlled through an arrangement of the kind of that shown by Fig. 5. This arrangement includes the motor 22 of the embodiment of Fig. 3, with its clutch 23 controlled by coil 24 fed with current through tube 14.

Shaft 25 carries in this case a cam 41 (shown in front view on the drawing) cooperating with a finger 42 applied against the periphery of said cam by a spring 43. This finger controls the sliding contact 44 of a variable resistor 45, acting as a potentiometer owing to the provision of a battery 47. With such an arrangement, the potential difference between the end 46 of the resistance and finger 44 varies automatically as a function of the time. This voltage replaces that existing across the terminals of resistance 30 in Fig. 4.

By suitably choosing the outline of cam 41, it is easy to obtain any desired law of variation, without any limitation.

In particular, this variation permits of obtaining a variation of the sensitiveness as a function of time such that sensitiveness is higher at the beginning, then drops rapidly to a relatively low value, and subsequently increases in a continuous manner as a function of time. The curve of sensitiveness corresponding to this is that of Fig. 6. This arrangement permits of correctly recording the front of the fastest superficial waves, the times of arrival of which correspond to portion A of the curve, of eliminating the high amplitude oscillations of the superficial waves which come next, and in particular the Rayleigh or Love waves which arrive during the time period corresponding to portion B of the curve, and finally of correctly recording the reflected rays coming from deeper and deeper mirrors.

Of course, the above mentioned arrangements are not the only possible embodiments of the invention within the scope of the principle thereof.

Figure 10:
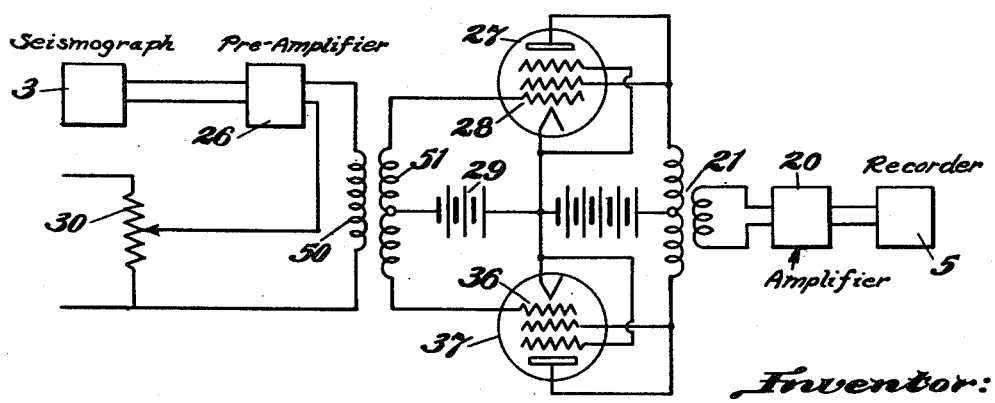
Fig. 10 shows a modification of the system of Fig. 4 with two amplifier tubes connected in push-pull.

In particular, in the arrangement of Fig. 4, I might arrange tubes 27 and 37 in such manner as to constitute a true push-pull system, the signal coming from pre-amplifier 26 being applied, in phase opposition, to grids 28 and 36, according to a well known circuit arrangement, the variable polarization voltage being of course the same in magnitude and direction for each of the grids. Such an arrangement is shown in Fig. 10, employing a coupling transformer 50, the ends of whose secondary 51 are respectively connected to grid 28 and grid 36 of tubes 27 and 37.

It is clear that, in this case, the increases of current, in the anode circuits, resulting from variations of polarization still eliminate each other.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention, as comprehended within the scope of the appended claims.

What I claim is:

1. An underground prospecting apparatus which comprises, in combination, means for detonating a charge of explosive, seismographs for detecting elastic waves in the ground, amplifiers coupled with said seismographs, one stage of said amplifiers including a thermionic tube with a variable grid polarization, and means connected to be placed into operation by said detonating means, for automatically varying said polarization in a gradual manner as a function of time, in such manner as to vary both the range of frequencies adapted to pass through said amplifiers and the sensitiveness of the apparatus.

2. Apparatus according to claim 1, said means for varying said polarization comprising a variable impedance element and cam means for continuously varying the adjustment of said variable impedance element, and means actuatable by said detonating means for driving said cam means.

3. An underground prospecting apparatus which comprises, in combination, means for detonating a charge of explosive, seismographs for detecting elastic waves in the ground, amplifiers coupled with said seismographs, one stage of said amplifiers including a thermionic tube with a variable grid polarization, said stage of said amplifiers having means for coupling the plate thereof to a succeeding amplifier, the reactance of said coupling means being low compared to the plate resistance of said stage whereby the frequency selectivity of said stage may be varied by varying the grid bias thereof, a resistor for partly producing said polarization, a condenser initially charged by a direct current source and connected with said resistor, and means operated by said detonating means upon action of said detonating means for discharging said condenser across said resistor, so as automatically to vary said polarization in a gradual manner, as a function of time.

4. A prospecting apparatus according to claim 3, in which both said condenser and said resistor are adjustable.

5. An underground prospecting apparatus comprising in combination, means for detonating a charge of explosive, seismograph means for detecting elastic waves set up in the ground, amplifying means, one stage of said amplifying means including a pair of thermionic tubes having their output circuits connected in push-pull the grid of each of said tubes having a non-uniformly spaced array of convolutions, means for applying a gradually decreasing grid bias potential to grid electrodes of said pair of tubes for gradually decreasing the internal resistance of said tubes, a transformer having the primary connected into said push-pull output circuit, and connections for applying the electrical oscillations corresponding to the detected elastic waves on a grid electrode of only one of said pair of tubes.

6. A device for geophysical prospecting comprising: means to create seismic waves in the earth, means to detect said waves and translate them into electrical vibrations, amplifying means, one stage of said amplifying means including a pair of tubes having their output circuits connected in push-pull, means for applying a gradually decreasing grid bias potential to grid electrodes of said pair of tubes for gradually decreasing the internal resistance of said tubes, a transformer having the primary thereof connected into said push-pull tubes' output circuit, the primary reactance of said transformer being low compared to the plate resistance of said push-pull tubes throughout a predetermined range of frequencies so that the selectivity of said push-pull tubes varies as the grid bias potential thereof is decreased, and connections for applying the electrical oscillations corresponding to the detected elastic wave on a grid electrode of only one of said pair of tubes.

7. An underground prospecting apparatus as set forth in claim 6 further comprising an amplifying device connected between said seismograph detecting means and the grid electrode of said last mentioned one of said pair of tubes, and an impedance device substantially equal to the output resistance of said last mentioned amplifying device connected to the grid electrode of the other of said pair of tubes so that the impedance of the input of said pair of tubes will be substantially balanced.

8. In geophysical prospecting apparatus, means for detonating a charge of explosive, a seismograph, an amplifier having its input connected to said seismograph and comprising a tube having a grid which has an array of non-uniformly spaced convolutions, and variable grid bias voltage means adapted to be initiated into operation by said detonating means and to thereafter apply to the grid of said tube a bias voltage which varies in instantaneous value at successive instants following said detonation actuation in predetermined desired manner, whereby the output of said amplifier varies in predetermined desired manner as a function of elapsed time following said detonation.

9. Apparatus as set forth in claim 8, and a compensating tube having its output connected in phase opposition to the output of said first mentioned tube, and a circuit comprising voltage adjusting means connecting the grid of said compensating tube to said variable grid bias voltage means and being adjusted to apply to the output of said first mentioned tube a voltage to compensate for undesired response in the output of said first mentioned tube due only to said variable grid bias voltage means independent of the input from said seismograph.

RAYMOND MAILLET.

REFERENCES CITED

The following references are of record in the file of this patent:

UNITED STATES PATENTS

| Number | Name | Date |
| --- | --- | --- |
| 2,003,780 | Born | June 4, 1935 |
| 2,053,841 | Prescott | Sept. 8, 1936 |
| 2,158,198 | Prescott | May 16, 1939 |
| 2,167,492 | Sproule | July 25, 1939 |
| 2,207,398 | Floyd | July 9, 1940 |
| 2,193,620 | Cloud | Mar. 12, 1940 |
| 2,049,724 | Prescott | Aug. 4, 1936 |
| 2,160,224 | Minton | May 30, 1939 |
| 2,217,806 | Muffly | Oct. 15, 1940 |
| 2,375,283 | Cloud | May 8, 1945 |
| 2,376,195 | Scherbatskoy | May 15, 1945 |
| 2,354,420 | Minton | July 25, 1944 |
| 2,321,341 | Weatherby et al. | June 8, 1943 |